United States Patent

D'Alelio

[15] 3,664,993
[45] May 23, 1972

[54] ACRYLIC ESTERS OF HALOGENATED ACETYLENIC DIOLS

[72] Inventor: Gaetano F. D'Alelio, 2011 East Cedar St., South Bend, Ind. 46617

[22] Filed: Dec. 19, 1968

[21] Appl. No.: 785,338

[52] U.S. Cl...........................260/89.5, 117/145, 117/148, 117/155, 161/247, 204/159.22, 260/23.5, 260/30.4, 260/31.2, 260/32.8, 260/33.2, 260/33.6, 260/33.8, 260/47, 260/63, 260/77.5, 260/78.5, 260/83.5, 260/85.5, 260/86.1, 260/86.3, 260/86.7, 260/486, 260/632, 260/633, 260/885
[51] Int. Cl...........................C08f 3/64, C08f 3/66
[58] Field of Search..........................260/486 H, 89.5 H

[56] References Cited

UNITED STATES PATENTS

| | | | |
|---|---|---|---|
| 3,055,932 | 9/1962 | Verbanic et al. | 260/486 H |
| 3,255,163 | 6/1966 | Gobran et al. | 260/486 H |
| 3,393,186 | 7/1968 | Groves | 260/89.5 H |

*Primary Examiner*—Harry Wong, Jr.
*Attorney*—Walter J. Monacelli

[57] ABSTRACT

This invention relates to polymerizable acrylic esters of the halogenated acetylenic alcohols,

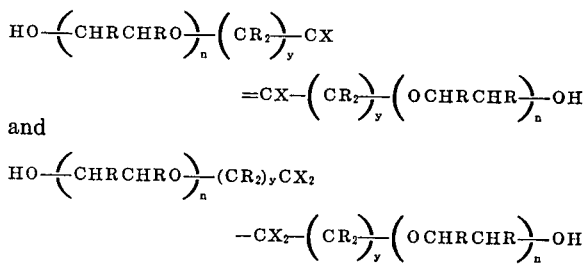

and wherein R represents hydrogen and a monovalent hydrocarbon containing one to ten carbon atoms, X is a halogen selected from the class consisting of chlorine and bromine, y represents a numerical value of 1 or 2, and n represents a numerical value of 1 to 3. These acrylic monomers are useful for the preparation of self-extinguishing homopolymers and copolymers; the diesters are also particularly useful as crosslinking agents for other monomers and polymers.

16 Claims, No Drawings

ACRYLIC ESTERS OF HALOGENATED ACETYLENIC DIOLS

PRIOR ART

No pertinent prior art is known. Copending application (DA-551) Ser. No. 785,336, filed the same date herewith, discloses related acrylic esters of halogenated acetylenic monoalcohols.

BACKGROUND OF THE INVENTION

This invention deals with polymerizable acrylic esters which contain halogen atoms in their structures. In general, it concerns mono- and di-acrylic esters of polyhalogenated acetylenic diols. In particular, it deals with the acrylic-type esters of halogenated ethylenic diols selected from the class of

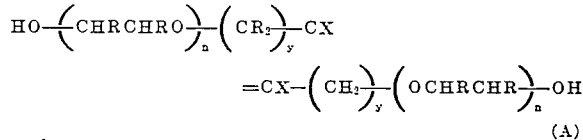

and

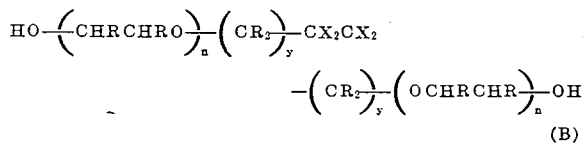

In the above formulas, R represents hydrogen and a monovalent hydrocarbon containing one to 10 carbon atoms, X is a halogen selected from the class consisting of a chlorine and bromine, Y has a numerical value of 1 or 2, and n has a numerical value of 1 to 3. Copending applicational Ser. No. 785,337 (Docket 552A), filed the same date herewith covers related compounds in which at least one n is zero.

Typical esters of the invention are those in which one or both of the alcoholic hydroxyl groups in formulas (A) and (B) have been replaced by an acryloxy group of the formula, $$\text{CH}_2\text{=}\overset{\text{R}'}{\underset{|}{\text{C}}}\text{—COO—}$$

wherein R' represents hydrogen, methyl and the halogen X, as defined hereinabove. These esters are readily prepared by esterifying the alcohols of formulas (A) and (B) with the acrylic chlorides, anhydrides or acids,

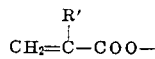

respectively, by procedures well known in the art. When the acid chloride is used, a hydrohalide acceptor, such as tertiary amine, as for example, the trialkylamines, dimethylaniline and the like, preferably are used in the reaction.

The halogenated dialcohols of the formulas (A) and (B) from which the acrylic esters of this invention are prepared are obtained very readily by the reaction of bromine or chlorine with the acetylenic alcohols corresponding to these formulas. When one mole of halogen is reacted with the acetylenic dialcohols, the dihalo-compound is obtained, whereas when two moles of halogen are reacted the tetrahalo compound is obtained:

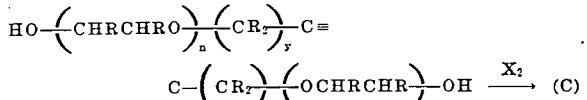

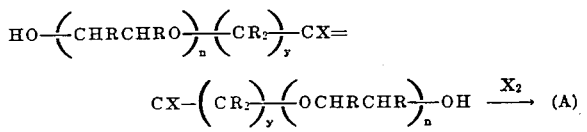

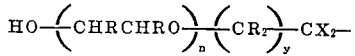

The alcohols of formula (C) are derivatives of acetylene from which they are easily prepared, and a number of which are commercial products. When in formula (C), $n$ is 1 and $y$ is 1, these acetylenic diols have formula (D), $\text{HOCHRCHROCR}_2\text{C} \equiv \text{CCR}_2\text{OCHRCHROH}$, and are prepared from acetylene by reaction with aldehydes and ketones, such as for example, with $\text{CH}_2\text{O}$, $\text{CH}_3\text{CHO}$, $\text{C}_4\text{H}_9\text{CHO}$, $\text{C}_8\text{H}_{17}\text{CHO}$, $\text{C}_9\text{H}_{19}\text{CHO}$, $\text{C}_{10}\text{H}_{21}\text{CHO}$, $\text{C}_6\text{H}_{11}\text{CHO}$, $\text{C}_6\text{H}_5\text{CHO}$, $\text{CH}_3\text{CH}=\text{CHCHO}$, $\text{C}_6\text{H}_5\text{CH}=\text{CHCHO}$, $\text{CH}_3\text{COCH}_3$, $\text{C}_2\text{H}_5\text{COCH}_3$, $\text{CH}_3\text{COC}_{10}\text{H}_{21}$, $\text{C}_{10}\text{H}_{21}\text{COC}_{10}\text{H}_{21}$, etc., and subsequent reaction with oxirane compounds,

as follows:

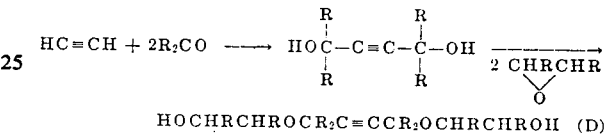

When, in formula (C), $n$ is 2 and $y$ is 2, these acetylenic diols have the formula (E), $\text{H}(\text{OCR}_2\text{CR}_2)_2\text{C} \equiv \text{C}(\text{CR}_2\text{CR}_2\text{O})_2\text{H}$, and are prepared by the reaction of acetylene with higher proportions of oxirane compounds,

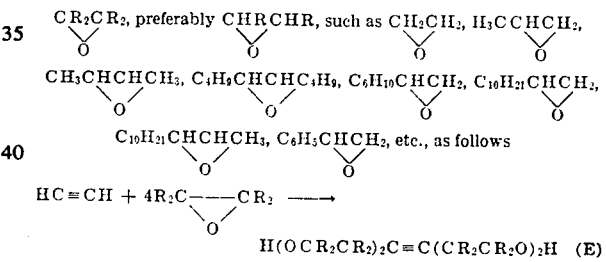

The acrylic esters of this invention can be formulated as having the structures

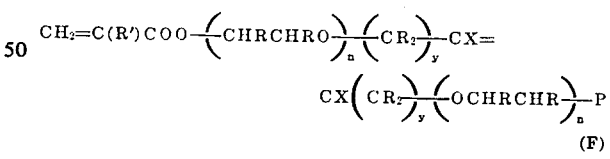

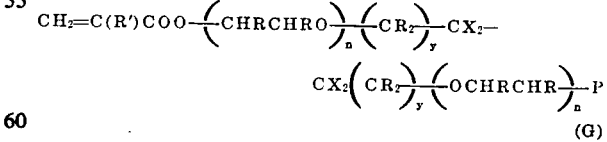

wherein P represents —OH and $\text{CH}_2\text{=C(R')COO—}$ and in which R', R, $n$, $y$ and X have the same meaning as defined hereinabove.

Typical R hydrocarbon groups are methyl, ethyl, propyl, butyl, amyl, hexyl, heptyl, nonyl, decyl, phenyl, tolyl, xylyl, ethylphenyl, naphthyl, methylnaphthyl, phenethyl, benzyl, phenylpropyl, naphthylmethyl, cyclohexyl, cycloheptyl, methylcyclohexyl, ethylcycloheptyl, cyclohexylethyl, etc.

The esters of this invention are useful with their halogen content as flame retardants and for the preparation of flame-retardant compositions. They are particularly useful for the preparation of homopolymers as well as copolymers with other vinyl type monomers, including other esters of this invention. Also, these esters find utility not only as monomers but also plasticizers and fire-retardant additives to other nonpolymeric as well as polymeric materials. Especially are they suited as the vinyl monomer, alone or with other monomers, for coreaction with the unsaturated polyesters, typical examples of which are the polyalkylene maleates and fumarates, as well as those unsaturated polyesters modified by non-olefinic polycarboxylic acids such as phthalic, tetrachlorophthalic, tetrabromophthalic or chlorendic anhydride.

The polymerizable monomers of this invention, as illustrated, for example, by the acrylate, methacrylates, etc., are readily polymerized or copolymerized to polymers by radical generating initiators, such as the peroxides, hydroperoxides, peracetates or by redox systems including hydrogen peroxide with ferrous salts or sodium bisulfite, potassium or sodium persulfate with bisulfate, etc.; ultraviolet light, etc. Radical polymerizations are well known in polymer science and are applicable to the monomers of this invention.

The production of soluble polymers, especially from the methacrylic esters of formula (F),

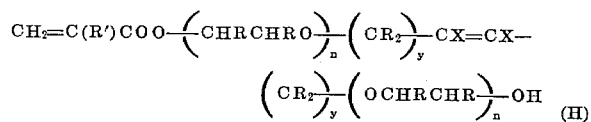

which contain two double bonds is surprising, particularly since other acrylic esters having two double bonds, such as $CH_2 = CHCOOCH_2CH = CH_2$, and $CH_2 = CHCOOCH_2C \equiv CH$, crosslink under radical polymerization as shown in J. Polymer Sci., 5, 323–337, 813–832, 994–1014 (1967).

The solubility of polymers of formula (H) permits them to be used as modifiers of other polymers, for example, as a coreactant in polyurethane formulations.

Furthermore, the new esters of this invention cannot be prepared by first synthesizing the acrylic esters of the acetylenic diols and then halogenating the acrylic esters, because the halogenation is not selective and causes halogenation, simultaneously, of all or most of the vinyl bonds in the acrylic esters, thereby destroying the polymerizability of the compound, for example,

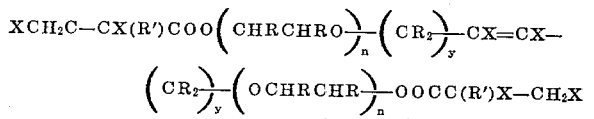

The monomers of this invention homopolymerize and copolymerize readily such as by means of radical type initiators, ultraviolet light, ionizing radication or thermally. The homopolymerizations and copolymerizations may be performed (1) in mass, that is, neat, in the absence of added solvents or dispersion media; (2) in suitable organic substances which are solvents for the monomers as well as the polymers, or which are solvents for the monomers and not for the polymers, in which cases the polymers precipitate from the media; or (3) in emulsion systems which are well known in the art and which comprise an emulsifying agent such as soaps, synthetic emulsifiers, such as dodecylbenzene sulfonate sodium salts, sodium sulfodioctylsuccinate and the like, in water. In emulsion systems water-soluble radical initiators such as potassium persulfate, hydrogen peroxide, sodium perborate, urea peroxide, etc., are used alone or in the presence of a redox agent, such as sulfur dioxide, sodium bisulfite, ferrous sulfate, etc.

Thus, the polymers and copolymers of this invention can be prepared by the vinyl type polymerization by means of radical initiators such as the peroxy and azo catalysts as such or as redox systems as well as by ultraviolet and ionizing radiation. Of the azo-type catalysts, azobisisobutyronitrile is a typical example and is especially preferred. The peroxy catalysts are illustrated by stearoyl, lauroyl, and butyroyl peroxide but for economic reasons benzoyl peroxide, tertiary butyl peroxide and tertiary butyl peracetate are preferred, but any of the other well known peroxy catalysts such as cumene peroxide and the like can also be used.

The diacrylic esters yield insoluble crosslinked polymers and copolymers, whereas the monoacrylic esters yield soluble polymers.

When solutions of the non-crosslinked polymers are desired, they can be obtained readily by polymerization in a suitable organic solvent or a mixture of organic solvents such as methyl acetate, ethyl acetate, acetone, methylethyl ketone, methylisobutyl ketone, benzene, toluene xylene, dioxane, tetrahydrofuran, chloroform, carbon tetrachloride, ethylenedichloride, dibutyl ether, etc. In such cases a solution of 5 to 75 percent of the monomer in the solvent is used.

When low molecular weight polymers are desired, the amount of radical initiator used may be as high as 3–4 percent by weight of the monomer or comonomers used; and the molecular weight may be further controlled by the use of radical chain transfer agents such as chloroform, carbon tetrachloride, octyl mercaptan, dodecyl mercaptan and the like. When high molecular weight polymerization products are desired, the polymerizations are performed preferably in the absence of chain transfer agents and only sufficient initiator to overcome the induction period of the system, such as of the order of 0.025 to 0.1 percent by weight of initiator. Alternately, the polymerization may be achieved thermally, simply by heating to generate the initiating radicals.

The polymerization can be performed over a wide range of temperatures depending upon whether the system is a mass, a solution or an amulsion polymerization and whether the initiation is by a redox system, ultraviolet or ionizing radiation. With ionizing radiation, polymerization can be achieved at $-40°$ C.; the redox polymerizations can be performed at $0°$ to $70°$ C.; and thermal polymerizations can be performed up to temperatures of the order of $100°$-$125°$ C. or higher.

The new monomers of this invention can be copolymerized with other vinyl monomers, such as the acrylic and methacrylic esters such as the methyl, ethyl, propyl, butyl, hexyl, cyclohexyl, dodecyl, etc. esters. In addition to, or in lieu of these acrylic-type esters used in copolymerization to prepare the starting polymer, any other copolymerizable monovinyl or monovinylidene comonomer or mixtures thereof can be used, for example, the vinyl esters, that is, vinyl acetate, and the monovinyl esters of saturated and unsaturated, aliphatic, monobasic and polybasic acids, and more specifically, the vinyl esters of the followinc acids: propionic, isobutyric, valeric, caprylic, caproic, oleic, stearic, acrylic, methacrylic, crotonic, oxalic, malonic, succinic, glutaric, adipic, suberic, azelaic, maleic, fumaric, itaconic, mesaconic, hexahydrobenzoic, citric, trimesic, etc., as well as the corresponding allyl, methallyl, etc. esters of the aforementioned acids, methyacrylic acid, hydroxy propyl methacrylate, etc.; itaconic acid monoexters and diesters, such as the methyl, ethyl, butyl esters, the maleic and fumaric acid monoexters, diesters and their amide and nitrile compounds, such as diethyl maleate, maleyl diamide, fumaryl dinitrile, dimethyl fumarate, etc.; acrylonitrile, methacrylonitrole, etc.; ethers, such as methallyl ethyl ether, vinyl ethyl ether, vinyl butyl ether, allyl propyl ether; cyanuric acid derivatives having one copolymerizable unsaturated group attached directly or indirectly to the triazine ring, such as allyl diethyl cyanurate, vinyl diethyl cyanurate, as well as the partial, soluble or fusible polymerizable polymers of the hereinabove listed monomers, etc.

Typical suitable aromatic comonomers include vinyl aryl compounds such as styrene, vinyl naphthalene, vinyl toluene, vinyl xylene, vinyl phenol, vinyl ethyl benzene, vinyl dimethyl naphthalene, vinyl diphenyl, etc., vinyl phenyl ether, vinyl benzoate, vinyl naphthoate, vinyl methyl phthalate, allyl ethyl phthalate, allyl propyl phthalate, etc.

The polymeric compositions of this invention are particularly useful as coating compositions on all types of substrates, including cellulose in its various forms, such as paper, wood, paper board, wood board, wood pulp, regenerated cellulose in film or fiber form, laminates of various types including those prepared from fibrous fillers bonded with urea, melamine, epoxy and polyester resins, plaster board, concrete in its various forms such as slabs, blocks and the like. They may also be used as impregnants for porous bodies such as the compositions hereinabove named, as well as for synthetic and natural sponges, etc. Particularly do they find use as bonding agents and adhesives for solid, porous and foamed bodies. They can be used alone or admixed with each other or with other copolymerizable monomers, unsaturated or saturated polymers, in the absence or presence of dyes, pigments, plasticizers. For coating, impregnating or adhesive compositions where the presence of small amounts of solvent in the cured composition is not objectionable they can be mixed with volatile or non-volatile solvents best suited to the particular application.

The polymers of this invention are also useful in the preparation of copolymers with unsaturated alkyd resins. In carrying this portion of the invention into effect, an esterification product of a polyhydric alcohol and an alpha, alpha-unsaturated polycarboxylic acid is first prepared in accordance with techniques now well-known to those skilled in the alkyd resin art, such as ethylene glycol maleate, propylene glycol maleate, ethylene glycol maleate-phthalate, ethylene glycol maleate-acrylate, propylene glycol-fumarate-methacrylate and the like.

In many cases, instead of copolymerizing a single monomer of this invention with a single alkyd resin, mixtures can be used of two or more such monomers with a single alkyd resin, or a single monomer can be used with two or more alkyd resins, or a mixture of two or more monomers with two or more alkyd resins.

The polymers of this invention can be used alone or with fillers, dyes, pigments, opacifiers, lubricants, plasticizers, natural and synthetic resins or other modifying bodies in, for example, casting, molding, laminating, coating applications, and as adhesives, impregnants and protective coatings.

In preparing copolymers, the monomers of this invention can constitute as much as 98–99.5 percent by weight of the whole, or the modifying comonomer or alkyd resin can constitute 98–99.5 percent of the whole.

In general, the proportions of the components used in a particular formulation will depend upon the particular properties desired in the interpolymer. For most applications, it is preferred to use 20 to 80 percent of the monomers of this invention and from 80 to 20 percent of the modifying polymer or monomer, since within these ranges interpolymers best adapted for most commercial applications can be produced.

Within these ranges the new interpolymers have a wide range of properties. For example, depending upon the particular crosslinking polymer and any modifying polymer or monomer, the particular proportions thereof, the conditions of polymerization, such as the temperature, pressure, presence or absence of additives, etc., and the extent of polymerization, they can vary from soft flexible bodies to hard rigid masses of varying resistance to solvents.

For coating or impregnating applications where the presence of a small amount of solvent in the cured composition is not objectionable, the mixed starting component can be diluted with volatile or nonvolatile solvents or diluents best suited for the particular service application, and then can be polymerized after the application of the solution to the particular article to be coated or impregnated, or impregnated and coated. By suitable selection of the starting material and the conditions of the interpolymerization, interpolymers can be obtained in an insoluble, infusible state practically resistant to the destructive effect of other chemical bodies, such as acid, bases, salts, solvents, swelling agents, and the like.

When it is desired to modify the properties of the cross linkable monomers of this invention, this can be accomplished by copolymerizing a mixture comprising at least one such polymer with at least one copolymerizable monomer containing at least one unsaturated ethylenic, or acetylenic hydrocarbon radical, more particularly, a

radical, such as vinyl, allyl, methallyl, vinylidene, etc., or with a copolymerizable compound containing at

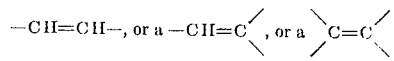

grouping, for example as in vinylidene fluoride, vinylidene cyanide, vinyl propionate, maleic anhydride, or its esters and amides, methyl maleic anhydride, tetrafluorethylene, etc.

Additional examples of copolymerizable comonomers are monomeric or partially polymerized vinyl esters, such as the acetate, propionate, etc., vinyl ketones, methyl vinyl ketones, olefinic nitriles, such as acrylonitrile, methacrylonitrile, fumaryl nitrile, beta-cyanoethylacrylate, acrylic and methacrylic esters, for example, methyl acrylate, ethyl acrylate, propyl acrylate, butyl acrylate, ethyl methacrylate, propyl methacrylate, butyl methacrylate, octyl methacrylate, glycol dimethacrylate, allyl methacrylate, etc.; itaconic esters, for example, diamyl itaconate, divinyl itaconate, diallyl itaconate; olefinic amides, for example, acrylamide, itaconamide, the maleic mono- and diamides, and the corresponding imides, etc., the vinyl ethers, for example, vinyl hexyl ether, vinyl isobutyl ether, vinyl cyclohexyl ether, the dienes, etc., for example, butadiene, isoprene, dimethyl butadiene, etc., the O-, m- and p-methyl and chloro styrenes, etc.

In preparing the copolymers of the crosslinkable monomers with polymerizable comonomers such as methyl methacrylate, styrene, acrylonitrile, and the like, the crosslinkable polymer can constitute as little as 0.1 percent by weight of the whole, whereas in other cases the crosslinkable polymers can constitute as much as 98–99 percent of the whole. The proportion of the components in a particular formulation will depend upon the particular comonomers used and the particular properties desired in the copolymer. The polymers and copolymers can be prepared most readily by ionizing radiation.

The acrylic monomers of this invention are particularly suitable for grafting to polymers in fiber form, by techniques well-known in the art to render the fibers non-burning, such as to the polymer fibers and textiles of nylon, polyvinyl alcohol, regenerated cellulose, cotton, etc. One particularly useful method is to form a redox metal complex of either acidic cellulose or a xanthated cellulose and to graft the monomer directly to the cellulose.

Various methods of practicing the invention are illustrated by the following examples. These examples are intended to illustrate the invention and not in any sense to limit the manner in which the invention can be practiced. The parts and percentages recited therein and all through this specification, unless specifically provided otherwise, refer to parts by weight and percentages by weight.

EXAMPLE I a. To 86 parts of 2-butene diol, $HOH_2C \equiv CCH_2OH$, in 350 parts of $CCl_4$ is added slowly with stirring at 0°–25° C. 161 parts of bromine in 625 parts of $CCl_4$ and the reaction allowed to continue, after the bromine addition, for 3 hours at 25°–40° C. The reaction mixture is then washed, first with aqueous 10 percent $NA_2CO_3$, then with distilled water, following which, the $CCl_4$ layer is separated, dried over anhydrous sodium sulfate, decolorized with activated carbon, filtered, and the $CCl_4$ removed by distillation at reduced pressure, leaving an almost quantitative yield of $HOCH_2CBr = CBrCH_2OH$, melting point on recrystallization, 116.5°–117° C. The elemental analysis yields values of 19.47 percent C and 65.06 percent Br, which are in good agreement with the theoretical values.

b. When procedure (a) above is repeated, using 322 parts of bromine instead of 161 parts, there is obtained the tetrabromo derivative, $HOCH_2CBr_2—CBr_2CH_2OH$, 78.7 percent bromine, which is in close agreement with the theoretical value.

c. Into a stirred solution of 86 parts of $HOH_2CC \equiv CCH_2OH$ in 500 parts of $CCl_4$, maintained at 10°–15° C., is slowly passed a stream of chlorine until 71 parts of $Cl_2$ are reacted. Then the solution is purified by the procedure of Example I(a) above, yielding $HOCH_2CCl = CClCH_2OH$, m.p. 78° C., which on analysis for chlorine yields a value of 45.26 percent which is close to the theoretical value for the compound.

Bromination of this compound by the procedure given in Example I(a) yields the product

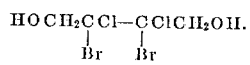

d. The above procedures are typical of those used to prepare the following starting dihalo- and tetrahalo-diols for subsequent conversion to esters of this invention.

| Dihalo-diols | Tetrahalo-diols |
|---|---|
| (1) $HOCH_2CBr=CBrCH_2OH$ | (a) $HOCH_2CBr_2-CBr_2CH_2OH$ |
| (2) $HOCH_2CCl=CClCH_2OH$ | (b) $HOCH_2CCl_2CH_2OH$ |
| (3) $HOCH_2CH_2CBr=CBrCH_2CH_2OH$ | (c) $HOCH_2C(Br)(Cl)-C(Br)(Cl)CH_2OH$ |
| (4) $HOCH(CH_3)CH_2CBr=CBrCH_2CH(CH_3)OH$ | |
| (5) $HOCH(CH_3)CBr=CBrCH(CH_3)OH$ | (d) $HOC(CH_3)(CH_3)-CBr_2CBr_2C(CH_3)(CH_3)-OH$ |
| (6) $HOCH(C_6H_5)CBr=CBrCH(C_6H_5)OH$ | |
| (7) $HOC(CH_3)_2CBr=CBrC(CH_3)_2OH$ | |
| (8) $HOC(CH_3)_2CCl=CClC(CH_3)_2OH$ | |
| (9) $HOC(CH_3)(C_2H_5)CBr=CBrC(CH_3)(C_2H_5)OH$ | (e) $HOCH_2CH_2CBr_2-CBr_2CH_2CH_2OH$ |
| | (f) $HOC(CH_3)(CH_3)-CCl_2CCl_2C(CH_3)(CH_3)-OH$ |
| | (g) $HOC(CH_3)(CH_3)-HCBr_2CBr_2C(CH_3)(CH_3)-HOH$ |
| | (h) $HOC(CH_3)(CH_3)-HCCl_2CCl_2C(CH_3)(CH_3)-HOH$ | e. These diols are converted to the ethylene glycol, diethylene glycol, triethylene glycol, etc. derivatives, as represented by the $(OCHRCHR)_n$ portions of the formulas by reaction of the above diols with oxirane compounds of the formula

catalyzed by a small amount of alkali such as NaOH.

Typical of these derivatives prepared accordingly are:

$C(CH_3)COCl$ or 181 parts of $CH_2 = CHCOCl$) over a period of 2 hours. The mixture is then filtered to remove triethylamine hydrochloride and hexane is added to the filtrate until the solution becomes turbid. The solution is again filtered, decolorized with activated carbon and further purified by passing the solution through a column of chromatographic alumina or silica. The solvent is then removed from the solution at reduced pressure of 1 to 50 mm. Hg leaving the diester as a clear, viscous oil. The diesters so prepared can be used directly, but if further purification is desired or required, such purification is readily accomplished in a falling film evaporator. The anhydrides of acrylic and methacrylic acid, $[CH_2 = C(R)CO]_2O$, can be used instead of the acid chlorides.

By the use of the above procedure, the acrylic esters and the methacrylic esters of the dihalo-diols, (10) to (16) inclusive, and of the tetrahalo-diols, (i) to (n) inclusive, are readily prepared, whose elemental analyses for halogen are in good agreement with the calculated values.

Similarly, the chloroacrylic esters and the bromoacrylic esters are prepared by using the halogenated acid chlorides $CH_2 = C(Cl)COCl$ and $CH_2 = C(Br)COCl$ respectively.

| Dihalo Compounds | Tetrahalo |
|---|---|
| (10) $HOCH_2CH_2OCH_2CBr=CBrCH_2OCH_2CH_2OH$ | (i) $\left( HOCH_2CH_2OCH_2CBr_2 \right)_2$ |
| (11) $\left[ HOCH(CH_3)CH_2OCH(CH_3)CH_2OCH_2CBr \right]_2$ | |
| (12) $HO(CH_2CH_2O)_2CH_2CBr=CBrCH_2(OCH_2CH_2)_2OH$ | (j) $\left[ HO[CH(CH_3)CH_2O]_2CH_2CBr_2 \right]_2$ |
| (13) $HO(CH_2CH_2O)_3CH_2CCl=CClCH_2(OCH_2CH_2)_3OH$ | |
| (14) $\left[ HOCO(C_6H_5)CH_2O(CH_2)_2CCl \right]_2$ | (k) $\left[ HO(CH_2)_3OCH_2C(Cl)(Br) \right]_2$ |
| (15) $\left[ HO[CH(CH_3)CH_2O]_2CH_2CBr \right]_2$ | (l) $\left[ HOC(CH_3)_2CH_2OCH_2CCl_2 \right]_2$ |
| (16) $\left[ HO(CH_2CH_2O)_2C(CH_3)(C_2H_5)CBr \right]_2$ | (m) $\left[ HOCH(C_6H_5)CH_2O(CH_2)_2CCl_2 \right]_2$ |
| | (n) $\left[ HO(CH_2CH_2O)_3CH_2CCl_2 \right]_2$ |

EXAMPLE II

The following is a typical procedure for preparing diesters of the halogenated diols.

To a mixture of 800 parts of dry benzene, one part of tertiary butyl catechol, one mole of halogenated diol, and two moles of triethylamine, cooled to 5° C., there is added slowly with stirring two moles of the acid chloride, (209 parts of $CH_2=$

EXAMPLE III

To a mixture of 500 parts of dry benzene, 1 part of tertiary butyl catechol, 59 parts of trimethylamine and 340 parts of $HOCH_2CH_2OCH_2CBr = CBrCH_2OCH_2CH_2OH$, cooled to 5° C., there is added slowly with stirring over a period of 4 hours, 90 parts of $CH_2 = CHCOCl$. The mixture is then filtered to remove precipitated trimethylamine hydrochloride, and hexane is added to the filtrate until the solution becomes turbid, is then refiltered, decolorized with activated carbon and passed through a chromatographic column of silica. The benzene is then removed at 1 to 5 mm. Hg pressure leaving the product as a clear viscous oil. Its infrared spectrum shows strong bands for a free hydroxyl in the 3 micron region along with the typical vands expected for the acrylic ester linkages in the $12.34\mu$ region. Vapor phase chromatography indicated that the product consists primarily of monoester and about 11.2 percent of diester which corresponds to the diol diacrylate. Separation of the mono- and diesters is accomplished readily in a falling film evaporator at 0.05 mm. Hg pressure. The elemental analysis of bromine for the fraction showing the free-hydroxyl group is in good agreement with the calculated value for the compound, $CH_2 = CHCOOCH_2CH_2OCH_2CBr = CBrCH_2OCH_2CH_2OH$ By the above procedure the acrylic type monoesters of the dihalo-diols (10) to (16) inclusive and of the tetrahalo-diols (i) to (n) inclusive are readily prepared.

EXAMPLE IV

The following unsaturated polyesters are prepared, as illustrative of the class of unsaturated alkyd resins, by heating the ingredients in an inert nitrogen or carbon dioxide atmosphere.

| Alkyd Resin A. | Ethylene glycol maleate |
|---|---|
| | (parts by weight) |
| Ethylene glycol | 68.0 |
| Maleic anhydride | 98.0 |

The components are mixed and slowly heated in the course of 1 hour to 180° C. and held at this temperature for 4 to 6 hours, until the acid number is reduced to below 40.

| Alkyd Resin B. | Ethylene glycol-maleate-phthalate |
|---|---|
| | (parts by weight) |
| Ethylene glycol | 68.2 |
| Maleic anhydride | 49.0 |
| Phthalic anhydride | 74.0 |

The compounds are mixed and heated according to the procedure given above for Alkyd Resin A.

| Alkyd Resin C. | Propylene glycol-tetrabromophthalate |
|---|---|
| | (parts by weight) |
| Propylene glycol | 68.2 |
| Maleic anhydride | 65.0 |
| Tetrabromophthalic anhydride | 140.0 |

The compounds are mixed and heated slowly to 190° C. and held at this temperature for 3 hours, then raised to 200° C. until the acid number is at least 40 or lower.

EXAMPLE V

To 60 parts of $[CH_2 = CHCOOCH_2CH_2OCH_2CBr]_2$, in a glass tube, is added 0.5 parts of benzoyl peroxide and the mixture stirred at 25° C. until the radical initiator is dissolved; the tube is then sealed under nitrogen and heated at 75° C. for 24 hours and 100° C. for 24 hours. There is obtained a clear, almost water white, insoluble, crosslinked polymer, which, when ignited and the source of flame withdrawn, is self-extinguishing and does not continued to burn.

EXAMPLE VI

The procedure of Example V is repeated 13 times using individually the following monomers prepared according to Example II:

$[CH_2 = CHCOOCH_2CH_2OCH_2CCl]_2$
$[CH_2 = CHCOOCH(CH_3)CH_2OCH(CH_3)CH_2OCH_2CBr]_2$
$[CH_2 = CHCOO(CH_2CH_2O)_2CH_2CBr]_2$
$[CH_2 = C(CH_3)COO(CH_2CH_2O)_3CH_2CCl]_2$
$[CH_2 = C(CH_3)COOCH(C_6H_5)CH_2O(CH_2)_2CCl]_2$
$[CH_2 = C(Cl)COO[CH(CH_3)CH_2O]_2CH_2CBr]_2$
$[CH_2 = C(Cl)COO(CH_2CH_2O)_2C(CH_3)(C_2H_5)CBr]_2$
$[CH_2 = CHCOOCH_2CH_2OCH_2CBr_2]_2$
$[CH_2 = CHCOO[CH(CH_3)CH_2O]_2CH_2CBr_2]_2$
$[CH_2 = CHCOO(CH_2)_3OCH_2C(Cl)(Br)]_2$
$[CH_2 = C(CH_3)COOC(CH_3)_2CH_2OCH_2CCl_2]_2$
$[CH_2 = C(Cl)COOCH(C_6H_5)CH_2O(CH_2)_2CCl_2]_2$
$[CH_2 = CHCOO(CH_2CH_2O)_3CH_2CCl_2b]_2$

In all cases crosslinked, infusible, insoluble polymers with self-extinguishing properties are obtained.

EXAMPLE VII

The procedure of Example V is repeated using 50 parts of $CH_2=CHCOOCH_2CH_2OCH_2CBr=CBrCH_2OCH_2CH_2OH$ and there is obtained a clear, thermoplastic, rubbery polymer which is soluble in chloroform and which is self-extinguishing.

EXAMPLE VIII a. A mixture of 90 parts of methyl methacrylate and 10 parts of $CH_2 = CHCOOCH_2CH_2OC(CH_3)_2CBr = CBrC(CH_3)_{22}CH_2OOCHC$ $CH_2$ is copolymerized by the procedure of Example V and there is obtained a self-extinguishing, crosslinked copolymer.

b. A mixture of 95 parts of methyl methacrylate and 5 parts of $[CH_2 = C(CH_3)COOCH_2CH_2OCH_2CBr_2]_2$ is copolymerized by the procedure of Example V and there s obtained a crosslinked, self-extinguishing copolymer.

c. A mixture of 75 parts of methyl methacrylate and 25 parts of $[CH_2=C(CH_3)COO(CH_2CH_2O)_2CH_2CBr=]_2$ is copolymerized by the procedure of Example V and there is obtained a crosslinked, self-extinguishing copolymer.

d. A mixture of 50 parts of methyl methacrylate and 50 parts of $CH_2 = CHCOOCH_2CH_2OCH_2CH_2CBr = CBrCH_2CH_{22}CH_2OH$ is polymerized by the procedure of Example V and a thermoplastic self-extinguishing copolymer is obtained.

Example IX

Each of the procedures of Examples VIII(a), VIII(b) and VIII(c) are repeated six times using instead of methyl methacrylate, the same weights of methyl acrylate, styrene, acrylonitrile, betacyanoethyl methacrylate and vinyl chloroacetate, and in all cases crosslinked, self-extinguishing polymers are obtained.

EXAMPLE X a. To each of 50 parts of alkyd resins A, B and C respectively are added 50 parts of $CH_2 = C(CH_3)COOCH_2CH(CH_3)OC(CHD3)_2CBr = CBrC(CH_3)_2OCH(CH_3)CH_2OOCC(CH_3)=CH_2$ and 0.20 parts of tertiary butyl hydroperoxide and fiber glass mats impregnated according to procedures well-known in the art to 45 percent resin contents. A 3-ply laminate is prepared and placed between two layers of polyethylene film and cured for two hours at 100° C. and 4 hours at 125° C. The cured laminate, when tested for flame-resistant properties by A.S.T.M. Method D–635–44 is found to be non-burning and self-extinguishing.

b. The procedure of Example X(a) is repeated but 25 parts of the dimethacrylate monomer is replaced in separate tests by 50 parts of styrene, methyl methacrylate, vinyl acetate, triallyl cyanurate and triallyl isocyanurate respectively, and in all cases non-burning, self-extinguishing laminates are obtained.

c. The procedure of Examples X(a) and X(b) are repeated using individually instead of the dimethacrylate monomer, the monomers used in Example VI, and in all cases self-extinguishing laminates are obtained.

EXAMPLE XI

Under a nitrogen atmosphere, 50 parts of $CH_2=CHCOOCH_2CH_2OCH_2CBr_2$ containing 0.5 part of azobisisobutyronitrile is added to 20 parts of poly(cis-butadiene) and the mixture stirred at 25° C. until it is homogeneous; then the mixture is heated at 70° C. for 10 hours and at 120° C. for 16 hours and there is obtained a crosslinked, self-extinguishing polymerizate which is tough and exhibits good impact properties.

EXAMPLE XII

The following mixtures are first prepared:

(A) Methyl
  methacrylate ......................................................... 75.0
  $[CH_2 = CHCOO(CH_2CH_2O)_2CH_2CBr_2]_2$ ............... 25.0
  Benzophenone .................................................... 0.2
(B) Methyl
  methacrylate ......................................................... 65.0
  $CH_2 = C(CH_3)COOCH_2CH_2OCH_2CCl$
  $CClCH_2CH_2{}^{CH_2}OOOCC(CH_3) = CH_2$ .............. 25.0
  $PO(OCH_2CH = CH_2)_3$ ....................................... 10.0
  Benzophenone .................................................... 0.2 and then irradiated with ultraviolet light from a 100-watt mercury lamp until the mixtures become solid and hard. In both cases, self-extinguishing polymers are obtained.

EXAMPLE XIII

The following mixtures are first prepared:

EXAMPLE XIII
The following mixtures are first prepared:

| | | |
|---|---|---|
| (A) | $[CH_2=CHCOO(CH_2CH_2O)_2CH_2CBr]_2$ | 20 parts. |
| | $CH_2=\overset{CH_3}{\underset{\|}{C}}-COOCH_3$ | 80 parts. |
| (B) | $[CH_2=CHCOOCH_2CH(CH_3)OC(CH_3)_2CBr]_2$ | 20 parts. |
| | $CH_2=\overset{CH_3}{\underset{\|}{C}}-COOC_2H_5$ | 80 parts. |
| (C) | $[CH_2=C(CH_3)COOCH_2CH_2OC(CH_3)_2CBr]_2$ | 10 parts. |
| | $CH_2=\overset{CH_3}{\underset{\|}{C}}-COOCH_3$ | 80 parts. |
| | $CH_2=CHCOOCH_2PO(OC_2H_5)_2$ | 10 parts. |
| (D) | Alkyd Resin B | 60 parts. |
| | $[CH_2=CHCOOCH_2CH(C_2H_5)OCH_2CCl_2]_2$ | 20 parts. |
| | $CH_2=CHCOOCH_2CH_2OH$ | 5 parts. |
| | $CH_2=\overset{CH_3}{\underset{\|}{C}}-COOCH_3$ | 15 parts. |

Samples of mixtures (A), (B), (C) and (D) are placed in glass vials which are swept out with nitrogen and sealed. They are then exposed to the beam of a 1MEV van der Graaff accelerator, and insoluble, infusible, non-burning, self-extinguishing polymers are obtained at dosages varying from 4 to 8 megarads. Similar results are obtained when other sources of ionizing radiation are used, such as from natural or synthetic radioactive material, for example, from Cobalt 60 or from the Varian type travelling wave linear accelerators or the types of accelerators described in U.S. Pat. No. 2,763,609 and British Pat. No. 762,953.

When 20 ml.-wood ply is impregnated and saturated with the mixtures (A), (B), (C) and (D), then covered with 0.1 ml. polyethylene sheet and irradiated to 6 megarads as above, the polyethylene barrier sheet removed, the resulting cured, impregnated wood is found to be dense, water resistant, self-extinguishing and non-burning.

EXAMPLE XIV

A skein of 20 parts of cotton thread is placed in 500 parts of an aqueous solution containing 2.5 parts of NaOH, 2.5 parts of $CS_2$ and 0.05 parts of sodium dodecylbenzenesulfonate and allowed to stand for 30 minutes. The thread is then removed, washed thoroughly with distilled water and immersed in 500 parts of a solution containing 0.05 parts of $FeSO_4\cdot(NH_4)_2SO_4$ and 1.5 parts of tetra-kis-hydroxymethyl phosphonium chloride for 10 minutes. The thread is then washed with distilled water and suspended in 1,000 parts of an emulsion containing 12 parts of $[CH_2=C(CH_3)COOCH_2CH_2OC(CH_3)_2CBr]_2$, 0.1 part of sodium dodecylbenzenesulfonate and 1.5 parts of hydrogen peroxide and the mixture heated with agitation at 65°C. under nitrogen for 3 hours. The thread is then removed, washed with water, and dried; there is obtained 31.8 parts of grafted threads, which, when suspended and the ends are ignited, are self-extinguishing when the source of flame is removed.

The polymerization products of the acrylate esters of this invention can be represented as having a plurality of repeating units selected from the formulas

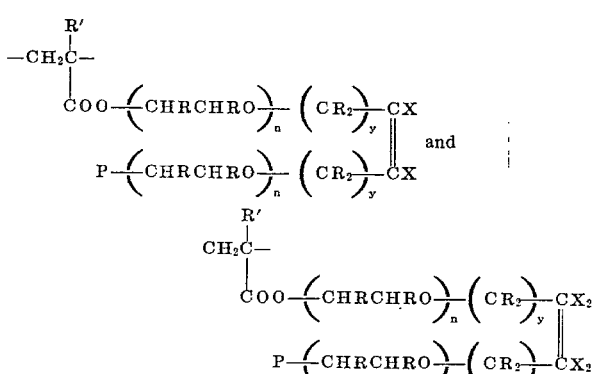

wherein R', R, X, y, n and P are defined above.

When P represents OH, the resulting repeating units do not form crosslinks per se.

When the monomer formulas have P representing $CH_2 = C(R')COO-$, crosslinked repeating units will be present in the polymer molecules having a formula selected from

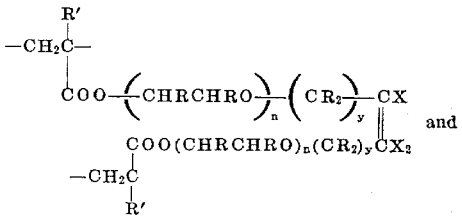

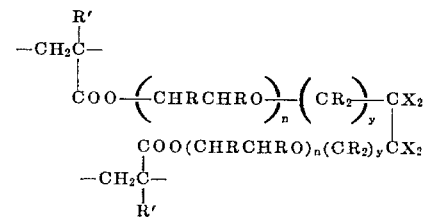

These are in addition to uncrosslinked repeating units in which P is $CH_2 = C(R')COO-$.

For example, with the monomer used in Example V the polymer has a plurality of repeating units therein selected from

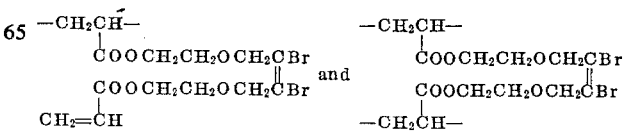

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. The acrylic ester having a formula selected from the class consisting of

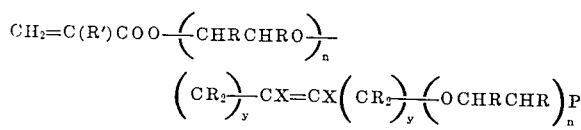

and

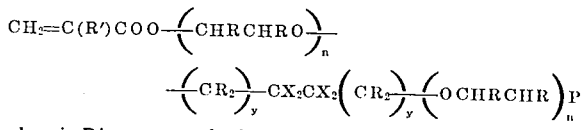

wherein R' represents hydrogen, methyl and X,
R represents hydrogen and a monovalent hydrocarbon containing one to 10 carbon atoms,
X is a halogen selected from the class consisting of chlorine and bromine,
y represents an integer having a value of 1 or 2,
n is an integer having a value of 1 to 3, and
P represents —OH or $CH_2 = C(R')COO$—.

2. The acrylic ester of claim 1 in which each y is 1, each n is 1, and P is $CH_2 = C(R')COO$—.

3. The acrylic ester of claim 1 in which each y is 2 and each n is 1.

4. The acrylic ester of claim 1 in which each y is 2 and each n is 2.

5. The acrylic ester of claim 1 in which each X is Cl.

6. The acrylic ester of claim 1 in which each X is Br.

7. The acrylic ester of claim 2 in which each $(CR_2)_y$ is —$CH_2$—.

8. The acrylic ester of claim 2 in which each $(CR_2)$ is

9. The acrylic ester of claim 2 in which each $(CR_2)$ is

10. The acrylic ester of claim 2 in which each $(CHRCHRO)_n$ is —$CH_2CH_2O$—.

11. The acrylic ester of claim 2, in which each $(CHRCHRO)_n$ is

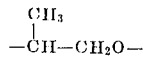

12. The ester having the formula $CH_2 = CHCOOCH_2CH_2OCH_2CBr = CBrCH_2OCH_2CH_2OOCHC = CH_2$.

13. The ester having the formula $CH_2 = C(CH_3)COOCH_2CH_2OCH_2CBr = CBrCH_2OCH_2CH_2OOCC(CH_3) = CH_2$ 14. A polymerization product of the ester of claim 1 having a plurality of repeating units therein selected from the class consisting of

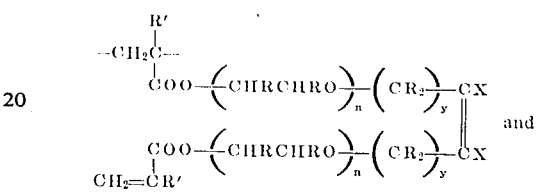

wherein R', R, X, y, n and P are as defined in claim 1.

15. A polymerization product of the ester of claim 1 having a plurality of repeating units therein selected from the class consisting of

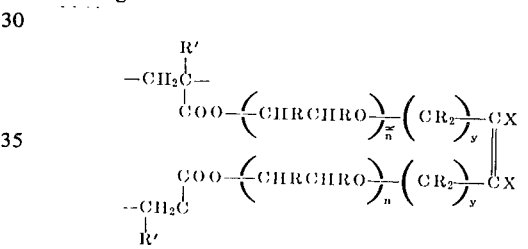

wherein R', R, X, y and n are as defined in claim 1.

16. A polymerization product of claim 14 in which P represents OH.

* * * * *